(12) United States Patent
Ishii et al.

(10) Patent No.: US 10,530,112 B2
(45) Date of Patent: Jan. 7, 2020

(54) SOLID-STATE LASER DEVICE

(71) Applicant: FUJIFILM Corporation, Tokyo (JP)

(72) Inventors: Hiroyasu Ishii, Kanagawa (JP);
Takatsugu Wada, Kanagawa (JP);
Keiji Tsubota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/200,132

(22) Filed: Nov. 26, 2018

(65) Prior Publication Data

US 2019/0097376 A1 Mar. 28, 2019

Related U.S. Application Data

(63) Continuation of application No. PCT/JP2017/019803, filed on May 26, 2017.

(30) Foreign Application Priority Data

May 27, 2016 (JP) .................. 2016-105869

(51) Int. Cl.
*H01S 3/08* (2006.01)
*H01S 3/02* (2006.01)
(Continued)

(52) U.S. Cl.
CPC ............ *H01S 3/025* (2013.01); *H01S 3/0615* (2013.01); *H01S 3/092* (2013.01); *H01S 3/042* (2013.01);
(Continued)

(58) Field of Classification Search
CPC ........ H01S 5/025; H01S 5/0615; H01S 5/092; H01S 5/0407; H01S 5/042; H01S 5/061;
(Continued)

(56) References Cited

U.S. PATENT DOCUMENTS 3,810,044 A 5/1974 Woodbury et al.
4,644,555 A 2/1987 Amano
(Continued)

FOREIGN PATENT DOCUMENTS

EP 3125377 A1 2/2017
JP 60-31284 A 2/1985
(Continued)

OTHER PUBLICATIONS

International Preliminary Report on Patentability and Written Opinion of the International Searching Authority (forms PCT/IB/373, PCT/ISA/237 and PCT/IB/326), dated Dec. 6, 2018, for corresponding International Application No. PCT/JP2017/019803, with a Written Opinion translation.

(Continued)

*Primary Examiner* — Kinam Park
(74) *Attorney, Agent, or Firm* — Birch, Stewart, Kolasch & Birch, LLP

(57) ABSTRACT

Provided is a solid-state laser device in which a linear resonator including an output mirror and a rear mirror, a laser rod, and optical members are provided on a common base and are contained in a housing having the base as a portion. A holding part is provided to hold an excitation light source that extends parallel to the laser rod on a side of the laser rod opposite to the base. The optical members including a Q-switch are disposed between the laser rod and the rear mirror. An upper end position of the output mirror is at a position lower than a lower end position of the excitation light source held by the holding part, with the base as a reference. The holding part holds the excitation light source so as to be capable of being inserted and extracted with respect to the output mirror side in a longitudinal direction of the excitation light source.

16 Claims, 9 Drawing Sheets

(51) Int. Cl.
  *H01S 3/06* (2006.01)
  *H01S 3/092* (2006.01)
  *H01S 3/0933* (2006.01)
  *H01S 3/16* (2006.01)
  *H01S 3/11* (2006.01)
  *H01S 3/042* (2006.01)
  *H01S 3/04* (2006.01)
  *H01S 3/106* (2006.01)

(52) U.S. Cl.
  CPC ............. *H01S 3/0407* (2013.01); *H01S 3/061* (2013.01); *H01S 3/0623* (2013.01); *H01S 3/0805* (2013.01); *H01S 3/08054* (2013.01); *H01S 3/0933* (2013.01); *H01S 3/106* (2013.01); *H01S 3/11* (2013.01); *H01S 3/1611* (2013.01); *H01S 3/1623* (2013.01); *H01S 3/1625* (2013.01); *H01S 3/1633* (2013.01); *H01S 3/1636* (2013.01)

(58) Field of Classification Search
  CPC .. H01S 5/0623; H01S 5/0805; H01S 5/08054; H01S 5/106; H01S 5/11; H01S 5/1623; H01S 5/1633; H01S 5/0933; H01S 5/1636; H01S 5/1625; H01S 5/1611
  See application file for complete search history.

(56) References Cited

U.S. PATENT DOCUMENTS

| 5,805,625 | A | 9/1998 | Langner et al. |
| 7,991,028 | B1* | 8/2011 | Bruno ..................... H01S 3/025 372/34 |
| 2003/0095581 | A1 | 5/2003 | Edwards |
| 2004/0240496 | A1 | 12/2004 | Fujikawa et al. |
| 2010/0054284 | A1* | 3/2010 | Dekker ................. H01S 3/1086 372/3 |
| 2015/0010030 | A1 | 1/2015 | Hirota |
| 2016/0190762 | A1 | 6/2016 | Nakabayashi et al. |
| 2016/0226214 | A1* | 8/2016 | Ishii ..................... A61B 5/0095 |
| 2017/0201058 | A1 | 7/2017 | Murakoshi |
| 2017/0229830 | A1 | 8/2017 | Hirota et al. |

FOREIGN PATENT DOCUMENTS

| JP | 61-82488 A | 4/1986 |
| JP | 1-304790 A | 12/1989 |
| JP | 3-231481 A | 10/1991 |
| JP | 5-218530 A | 8/1993 |
| JP | 11-150316 A | 6/1999 |
| JP | 2003-8118 A | 1/2003 |
| JP | 2003-198011 A | 7/2003 |
| JP | 2007-96063 A | 4/2007 |
| JP | 2011-18815 A | 1/2011 |
| JP | 2015-84401 A | 4/2015 |
| JP | 2015-111660 A | 6/2015 |
| JP | 2015-192044 A | 11/2015 |
| WO | WO 03/069738 A1 | 8/2003 |
| WO | WO 2016/051664 A1 | 4/2016 |

OTHER PUBLICATIONS

International Search Report (form PCT/ISA/210), dated Jul. 25, 2017, for corresponding International Application No. PCT/JP2017/019803, with an English translation.
Extended European Search Report, dated May 23, 2019, for European Application No. 17802941.9.
Quantel, "User's Manual Ultra CFR Nd: YAG Laser System", URL: ftp://ftp.mpic.ed/AWI_Dokumentation/B874%20-%20OCToFAMS/REV_A_open/Attachments/Attachment_07_QuantelUltra/Ultra.pdf, Apr. 1, 2007, XP055588695, 4 pages.
Japanese Office Action for Japanese Application No. 2018-519650, dated Sep. 3, 2019, with an English translation.

* cited by examiner

SOLID-STATE LASER DEVICE

CROSS-REFERENCE TO RELATED APPLICATIONS

This application is a continuation application of International Application No. PCT/JP2017/019803, filed May 26, 2017, the disclosure of which is incorporated herein by reference in its entirety. Further, this application claims priority from Japanese Patent Application No. 2016-105869, filed May 27, 2016, the disclosure of which is incorporated herein by reference in its entirety.

BACKGROUND OF THE INVENTION

1. Field of the Invention

The present invention relates to a solid-state laser device, and particularly, to a solid-state laser device in which a laser rod, which is a solid-state laser medium, is housed within a laser chamber.

2. Description of the Related Art

Solid-state laser devices are constituted of, for example, a resonator, a rod-shaped solid-state laser medium (laser rod) disposed in the resonator, an excitation light source, such as a flash lamp, which excites the laser rod, and optical members, such as a Q-switch. In many cases, the laser rod and the excitation light source are housed within a laser chamber having an internal space. Generally, an inner wall surface of the laser chamber is provided with a reflecting surface or a diffusing surface for efficiently irradiating a laser rod with the excitation light emitted from the excitation light source.

In the solid-state laser device, in a case where dust or dirt adheres to an optical member surface, for example, an end face of the laser rod or a reflecting surface of a resonator mirror, there is a possibility that the energy of the laser light is concentrated on the portion and the rod end face or the mirror reflecting surface is damaged. In order to protect the resonator mirror of the laser rod from dust or sort, various suggestions for a structure in which these are sealed within a housing are made.

Meanwhile, an excitation light source, such as a flash lamp, which excites the laser rod, is consumables, and is required to be periodically replaced. For that reason, in order to make replacement work of the flash lamp easy, JP2015-192044A and JP2015-084401A and the like suggest solid-state laser devices in which the flash lamp portion of the laser chamber is exposed from the housing, and the flash lamp is allowed to be pulled out from the laser chamber without opening a lid part of the housing.

Additionally, downsizing is widely demanded for the solid-state laser devices. JP2015-084401A suggests a solid-state laser device capable of easily replacing the excitation light source and capable of being downsized.

SUMMARY OF THE INVENTION

In JP2015-192044A and JP2015-084401A, an optical element that bends light at 90 degrees on an optical axis of one end face of the laser rod to form an L-shaped resonator structure is disposed, and another optical member is disposed at a position apart from a track from which the rod-shaped excitation light source held parallel to the laser rod above the laser rod is pulled out. Accordingly, easy replacement of the excitation light source and downsizing of the devices are realized.

However, further downsizing is demanded as the solid-state laser devices.

An object of the invention is to provide a solid-state laser device capable of easily replacing an excitation light source and capable of being downsized more than before, in view of the above circumstances.

A solid-state laser device of the invention comprises a linear resonator in which an output mirror and a rear mirror are disposed on a straight line; a laser rod disposed on an optical path of the resonator; optical members at least including a Q-switch; and a rod-shaped excitation light source that extends parallel to the laser rod and emits excitation light that excites the laser rod. The resonator, the laser rod, and the optical members are provided on a common base and are contained in a housing having the base as a portion. A holding part is provided to hold the excitation light source parallel to the laser rod on a side of the laser rod opposite to the base. The optical members including the Q-switch are disposed between the laser rod and the rear mirror. An upper end position of the output mirror is at a position lower than a lower end position of the excitation light source held by the holding part, with the base as a reference. The holding part holds the excitation light source so as to be capable of being inserted and extracted with respect to the output mirror side in a longitudinal direction of the excitation light source.

In the solid-state laser device of the invention, it is preferable that the output mirror is formed such that a reflective coating of a resonator surface of the output mirror is provided up to the upper end position.

In the solid-state laser device of the invention, it is preferable that upper end positions of the Q-switch and the rear mirror are higher than the lower end position of the excitation light source held by the holding part with the base as a reference.

It is preferable that the solid-state laser device of the invention further comprises a shutter as the optical member, the shutter is provided between the laser rod and the Q-switch, and a partition plate having an opening in the optical path is provided between the laser rod and the shutter inside the housing.

In the solid-state laser device of the invention, it is preferable that the housing has a first housing part that houses the output mirror and the laser rod, and a second housing part that houses the rear mirror and the optical members, and the first housing part includes a first lid that opens the first housing part, the second housing part includes a second lid that opens the second housing part, and the first housing part and the second housing part are openable independently.

In the solid-state laser device of the invention, it is preferable that the a material forming first lid and a material forming portions of the first housing part other than the first lid have linear thermal expansion coefficients of the same order.

In the solid-state laser device of the invention, it is preferable that the holding part includes a hole part that houses the excitation light source, and has a butting structure for the excitation light source in which a power source terminal is provided at an end of the hole part on the rear mirror side.

It is preferable that the solid-state laser device of the invention further comprises a pipe that supplies a cooling medium for cooling the excitation light source to the holding part, and the pipe is disposed to extend in a direction perpendicular to the base along a side surface of the housing from a hole provided in the base and is connected to the holding part.

It is preferable that the solid-state laser device of the invention further comprises a laser chamber having a columnar hole part shorter than a major-axis length of the laser rod, the laser rod is inserted through the hole part of the laser chamber, and is supported by the laser chamber in a state where both end parts of the laser rod are exposed from the hole part, an O-ring is provided at a root of at least one of both the end parts of the laser rod exposed from the hole part, and a cover member that hinders incidence of stray light generated within the housing onto the O-ring is further provided on a side surface of the laser rod closer to an end face side than the O-ring.

In the configuration including the O-ring, it is preferable that the solid-state laser device further comprises an O-ring retaining plate between the cover member and the O-ring and the O-ring retaining plate is made of at least one of ceramics, glass, or fluororesin.

It is preferable that the solid-state laser device of the invention further comprises a laser chamber having a columnar hole part shorter than a major-axis length of the laser rod, the laser rod is inserted through the hole part of the laser chamber, and is supported by the laser chamber in a state where both end parts of the laser rod are exposed from the hole part, an O-ring is provided at a root of at least one of both the end parts of the laser rod exposed from the hole part, and the O-ring is made of fluororesin.

In the solid-state laser device of the invention, it is preferable that the laser rod has an antireflection film on an end face thereof and has a chamfered part at a peripheral edge of the end face, and an opening defining part that constitutes an opening having a diameter smaller than a diameter of an outer periphery of the end face is provided at a position that faces at least one end face of the laser rod, and an end face protecting member is provided to limit a laser light path region in the end face of the laser rod to a region inside the outer periphery of the end face.

In the solid-state laser device of the invention, it is preferable that a distance from an optical member disposed closest to the laser rod side among the optical members to the rear mirror is shorter than a length of the excitation light source.

In the solid-state laser device of the invention, it is preferable that the laser rod is made of an alexandrite crystal.

In the solid-state laser device of the invention, it is preferable that a diameter of the laser rod is 3 mm or less, and a diameter of the excitation light source is 1.5 times or more the diameter of the laser rod.

Additionally, in this case, it is more preferable that a length of the laser rod is 75 mm or less.

The solid-state laser device of the invention includes the linear resonator in which the output mirror and the rear mirror are disposed on a straight line; the laser rod disposed on the optical path of the resonator; the optical members at least including the Q-switch; and the rod-shaped excitation light source that extends parallel to the laser rod and includes the flash lamp that emits the excitation light that excites the laser rod. The resonator, the laser rod, and the optical members are provided on the common base and are contained in the housing having the base as a portion. The holding part is provided to hold the excitation light source parallel to the laser rod on the side of the laser rod opposite to the base. The optical members including the Q-switch are disposed between the laser rod and the rear mirror. The upper end position of the output mirror is at the position lower than the lower end position of the excitation light source held by the holding part, with the base as a reference. The holding part holds the excitation light source so as to be capable of being inserted and extracted with respect to the output mirror side in the longitudinal direction of the excitation light source. Accordingly, easy replacement of the excitation light source is allowed, and downsizing can be realized more than before.

DESCRIPTION OF THE PREFERRED EMBODIMENTS

Figure 1:
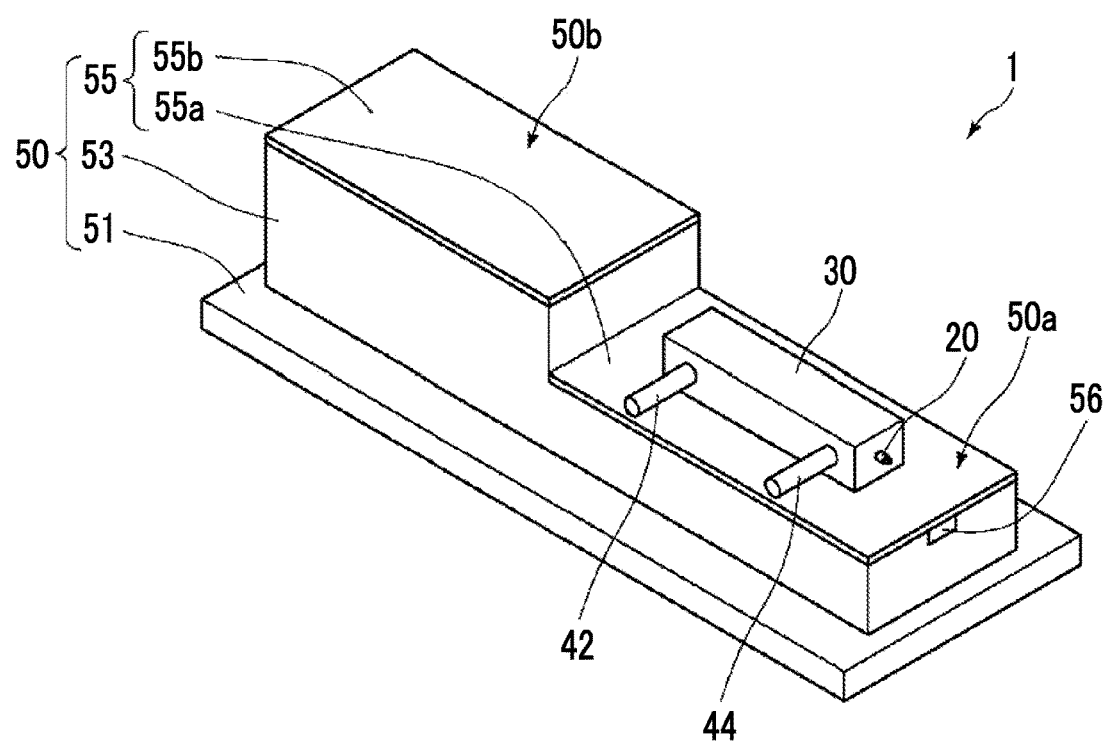
FIG. 1 is a schematic perspective view of a solid-state laser device related to a first embodiment.
Figure 2:
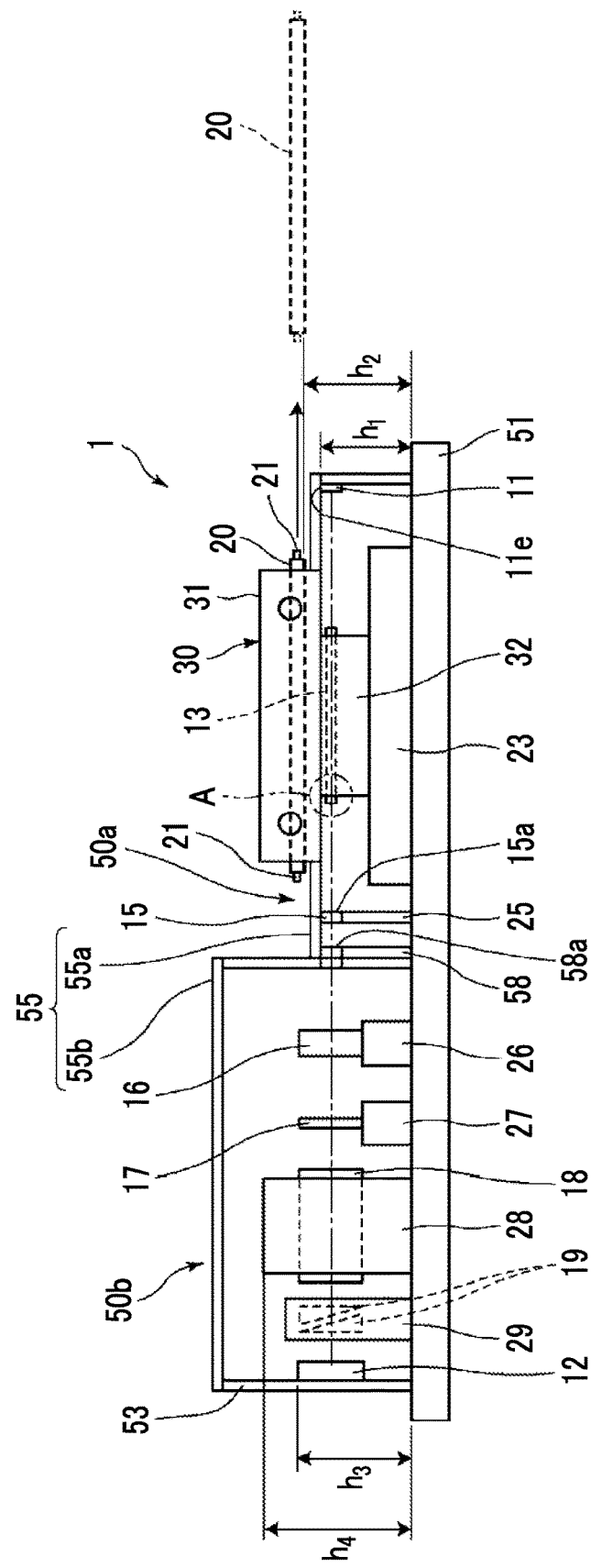
FIG. 2 is a side schematic view illustrating a schematic configuration in a side view of the solid-state laser device related to the first embodiment.
Figure 3:
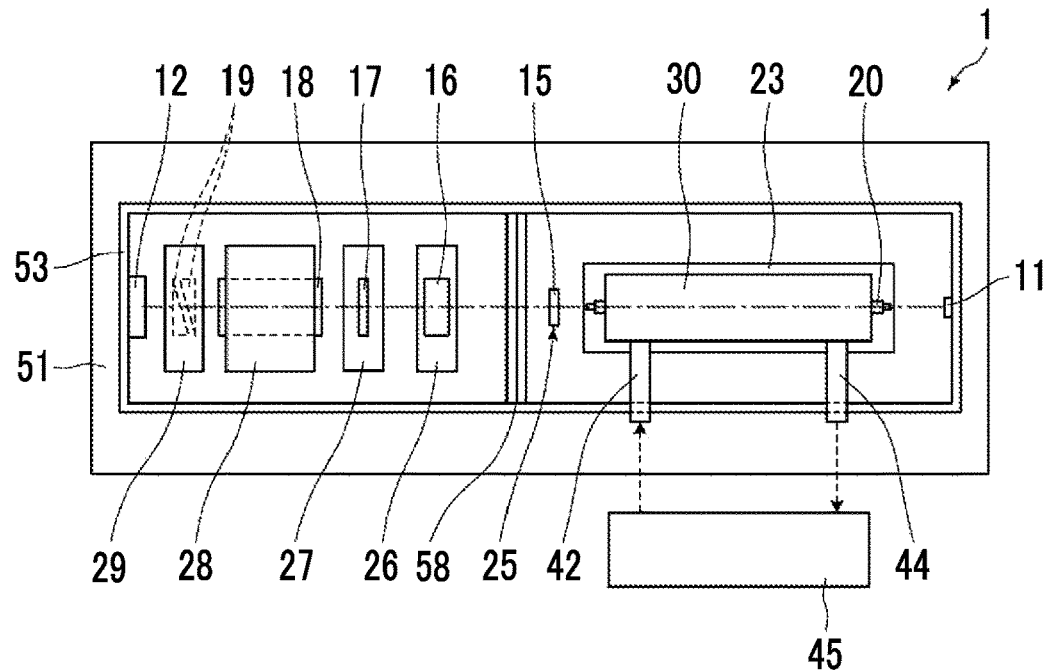
FIG. 3 is a plan schematic view illustrating the schematic configuration in a plan view of the solid-state laser device related to the first embodiment.

Hereinafter, embodiments of the invention will be described in detail with reference to the drawings. FIG. 1 is a perspective view schematically illustrating an external shape of a solid-state laser device related to a first embodiment of the invention. Additionally, FIGS. 2 and 3 are a schematic side view and a schematic plan view of the solid-state laser device related to the present embodiment, and both schematically illustrate the arrangement of internal constituent elements with a portion of the housing omitted.

A solid-state laser device 1 includes the pair of mirrors 11 and 12 that constitute the resonator, the laser rod 13 disposed in the resonator, and the laser chamber 30 that houses at least a portion of the laser rod 13. The solid-state laser device 1 further includes an aperture member 15, a polarizer 16, a shutter 17, a Q-switch 18, and a wedge prism pair 19, as optical members, between the one mirror 12 and the laser rod 13. The mirrors 11 and 12, the laser rod 13, and the optical members 15 to 19 are disposed in a housing 50. Here, a portion of the laser chamber 30 is exposed to the outside from the housing 50, and the flash lamp 20 is housed in the portion of the laser chamber 30 exposed from the housing 50.

The housing 50 is constituted of a flat plate-shaped base 51, a side wall part 53, and a lid part 55, and a portion of side wall part 53 is provided with an emission opening 56 for outputting the laser light. In the present embodiment, the housing 50 has a first housing part 50a that houses a second portion 32 in which the output mirror 11 and the laser rod 13, that is, the laser rod 13 of the laser chamber 30, is housed, and a second housing part 50b that houses the rear mirror 12 and the optical members 16 to 19. In addition, although main optical members, such as the Q-switch and a shutter, are housed in the second housing part 50b, the aperture member 15 is housed in the first housing part 50a.

The first housing part 50a and the second housing part 50b are separated from each other by a partition plate 58 having an opening 58a on an optical path inside the housing 50. By including the partition plate 58 between the shutter 17 and the laser rod 13, adhesion of dust caused due to sliding of a shutter sliding part on the laser rod 13 and on the optical path in the vicinity of the laser rod 13 can be suppressed. It is preferable that the opening 58a provided in the partition plate 58 has a diameter larger than the diameter of the laser rod 13 to such a degree that optical-axis adjustment is unnecessary.

In addition, as described above, although it is preferable that the partition plate 58 is provided inside the housing 50, the partition plate 58 may not be provided.

As illustrated in FIGS. 1 and 2, the height of the first housing part 50a and the height of the second housing part 50b are different from each other, the first housing part 50a includes a first lid 55a that opens the first housing part 50a, and the second housing part 50b includes a second lid 55b that opens the second housing part 50b. That is, the lid part 55 of the housing 50 includes the first lid 55a and the second lid 55b, and the first housing part 50a and the second housing part 50b are configured so as to be openable and closable independently. By virtue of the present configuration, during replacement of the optical members within the second housing part 50b and the optical-axis adjustment by the polarizer, this task can be performed by opening only the second housing part 50b with the first housing part 50a closed, and entering of dust into the first housing part 50a can be prevented.

In the present embodiment, the base 51 and the side wall part 53 of the housing 50 are basically made of strong metal, such as aluminum. The laser chamber 30 is installed in the first housing part 50a of the housing. Since the flash lamp 20 to be inserted through the laser chamber 30 has a structure in which positive and negative electrodes are provided in a glass tube in which gas is enclosed, it is necessary to apply a high voltage of several thousands of volts and several tens of thousands of volts to conductors around the electrodes in order to start discharge start between the electrodes. In the present configuration, discharge is started by applying the high voltage to the laser chamber 30. Thus, as the first lid 55a close to the laser chamber 30, a resin material having low conductivity is preferable from a viewpoint of electric safety. Meanwhile, during the driving of the flash lamp 20, there is heat generation of several hundreds of watts, and the housing part 50a has a remarkable temperature rise. Thus, in the present configuration, it is preferable that the portions other than the first lid 55a of the first housing part 50a are made of a material of which the digit number (order) of the linear thermal expansion coefficient is the same as that of the side wall part 53 of the housing 50.

For example, in a case where the side wall part 53 of the housing 50 is aluminum, the linear thermal expansion coefficient of the aluminum is $23.5 \times 10^{-6}/°C$. As the materials of the lids, resin materials, such as a modified PPO (polyphenylene oxide) having a linear thermal expansion coefficient of $22.0 \times 10^{-6}/°C$, a modified PPE (polyphenylene ether) having a linear thermal expansion coefficient of $52.0 \times 10^{-6}/°C$, and polycarbonate having a linear thermal expansion coefficient of $70.0 \times 10^{-6}/°C$, are suitable.

In addition, in the present embodiment, the lids 55a and 55b are provided on an upper surface of the housing 50 that faces the base 51. A configuration in which the respective housing parts 50a and 50b are openable and closable with one surface of the side wall part 53 of the housing 50 as a lid may be adopted.

The pair of mirrors 11 and 12 are disposed to face each on a straight line other with the laser rod 13 interposed therebetween and constitutes a linear resonator. The mirror 11 is a partial transmission mirror and functions as a so-called output mirror that outputs laser light. The mirror 12 is a high-reflection mirror and functions as a so-called rear mirror. In the present embodiment, the output mirror 11 is a planar mirror, and the mirror 12 is a concave mirror. Hereinafter, there is a case where the mirrors 11 and 12 is referred to as the output mirror 11 and the rear mirror 12, respectively. In the present embodiment, the output mirror 11 and the rear mirror 12 face each other and are attached to respective side surfaces in a lateral direction in the side wall part 53 that forms a portion of the housing 50. The output mirror 11 out of the output mirror 11 and the rear mirror 12 is attached to be capable of outputting the laser light from the emission opening 56 provided in a portion of the side wall part 53 of the housing 50.

The laser rod 13 is a solid-state laser medium, and is formed by machining, for example, a solid-state laser crystal, such as alexandrite ($Cr:BeAl_2O_3$), neodymium YAG (Nd:YAG (yttrium aluminum garnet), or titanium sapphire ($Ti:Al_2O_3$) in a rod shape. In addition, here, the rod shape is a columnar shape in which a distance between two disks serving as end faces is longer than the diameter of the disks. The solid-state laser medium is not limited to those mentioned above, and other known ones may be appropriately used.

In order to reduce the size of the entire device, it is preferable that the laser rod 13 has a small diameter and a short length. Since the energy density within a surface can be enhanced by making the diameter of the laser rod small, it is possible to shorten pulse width, and since resonator length can be shortened by making the length of the laser rod short, it is possible to shorten the pulse width. In the present embodiment, it is preferable that the laser rod 13 is made of alexandrite. In this case, making the diameter of the laser rod small and making the length of the laser rod short has a great effect also in terms of cost. It is preferable that a diameter (hereinafter referred to as "rod diameter") of a cross-section (circular cross-section) perpendicular to the length direction of the laser rod 13, is 4 mm or less. The rod diameter is more preferably 3 mm or less, and still more preferably 2.5 mm or less. Additionally, the rod length of the laser rod is preferably 75 mm or less, and more preferably 60 mm or less.

The flash lamp 20 is an excitation light source that emits the excitation light for exciting the laser rod 13, and the entire flash lamp including terminals 21 respectively provided at both ends thereof is formed substantially in a rod shape. The length of the flash lamp 20 may be appropriately determined in accordance with the length of the laser rod 13. Even in a case where the distance between the electrodes of the flash lamp is made longer than the laser rod, the excitation light is not absorbed by the laser rod and result in loss. Therefore, it is preferable that the distance between the electrodes is formed to be about the same as the light receiving length of the laser rod. Therefore, in a case where the length of the laser rod is 75 mm, the total length of the flash lamp is about 120 mm, and in a case where the length of the laser rod is 60 mm or less, the total length of the flash lamp is about 100 mm. In addition, the length of the flash lamp 20 is defined as a length in a longitudinal direction including the terminals 21. The diameter of the flash lamp 20 may also be appropriately determined in accordance with the diameter of the laser rod 13. In a case where the diameter of the flash lamp is larger than the diameter of the laser rod, the proportion of the most efficient excitation light, which directly reaches the laser rod from the flash lamp, decreases. Therefore, generally, the diameter of the flash lamp and the diameter of laser rod are made to be about the same. However, in a case where the diameter of the flash lamp is made to be about the same as that in a case where the diameter of the laser rod is as small as 3 mm or less, the current density of the flash lamp becomes high, and the lifespan of the flash lamp becomes remarkably short. In such a case, it is preferable that the diameter of the flash lamp is 1.5 times or more the diameter of the rod.

Conducting wires (not illustrated) are respectively connected to the two terminals 21, and the flash lamp 20 is connected to a light source for lighting via the conducting wires. In addition, more specifically, for example, a xenon flash lamp or the like can be applied as the flash lamp 20. Additionally, the excitation light source in the solid-state laser device of the invention is not applied to the flash lamp 20. For example, a flash lamp, which is formed in its entirety in a rod shape by disposing a plurality of light emitting diodes (LEDs) side by side within a transparent straight pipe, may be adopted.

The laser chamber 30 is of, for example, metal and is configured so as to house the laser rod 13 and the flash lamp 20. The laser chamber 30 has a space for housing the laser rod 13 and the flash lamp 20 therein and transmits the light emitted from the flash lamp 20 therein to the laser rod 13. For example, the reflecting surface is formed inside the laser chamber 30. Thus, the light emitted from the flash lamp 20 is directly radiated to the laser rod 13 or is reflected by the reflecting surface and radiated to the laser rod 13.

Pipes 42 and 44 are connected to a side wall of the laser chamber 30, and as schematically illustrated in FIG. 3, the laser chamber 30 is connected to a cooler 45 via the pipes 42 and 44. The cooler 45 is a device for cooling the laser rod 13 and the flash lamp 20. The cooler 45 supplies, for example, a cooling medium, such as pure water, to the laser chamber 30 through the pipe 42. The cooler 45 receives the wastewater from the laser chamber 30 through the pipe 44, lowers the temperature of the cooling medium, and then supplies the cooling medium again to the laser chamber 30. By circulating the cooling medium in this way, the temperature of the laser rod 13 within the laser chamber 30 can be maintained at a desired temperature range.

Figure 4:
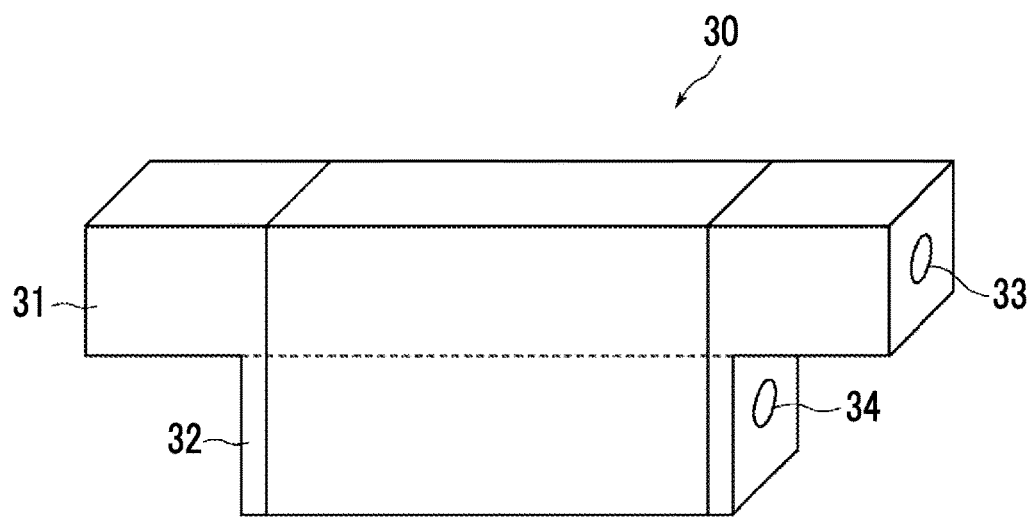
FIG. 4 is a perspective view of a laser chamber.

FIG. 4 is a perspective view illustrating an external appearance of the laser chamber 30. In FIG. 4, illustration of the holes for connecting the pipes 42 and 44 (referring to FIG. 1), and the like are omitted. The laser chamber 30 has a first portion 31 that houses the flash lamp 20, and a second portion 32 that houses the laser rod 13. The first portion 31 is provided with a hole part 33 that penetrates from a wall surface perpendicular to the longitudinal direction to the other wall surface and serves as a space for housing the flash lamp 20, and the second portion 32 is provided with a hole part 34 that penetrates from one wall surface perpendicular to the longitudinal direction to the other wall surface and serves as a space for housing the laser rod 13. That is, the two hole parts 33 and 34 are provided to be parallel to each other in the longitudinal direction of the laser chamber 30. The first portion 30 of the laser chamber 31 constitutes a holding part that holds the excitation light source (here, the flash lamp 20) in the solid-state laser device of the invention in parallel with the laser rod 13 on a side of the laser rod 13 opposite to the base 51.

The hole part 34 of the laser chamber 30 has a columnar shape shorter than the major-axis length of the laser rod 13, the laser rod 13 is supported in a state where the laser rod 13 is inserted through the hole part 34 and both end parts thereof are exposed from the hole part 34, and the flash lamp 20 is inserted through and supported by the hole part 33 (refer to FIG. 2). The shape of the hole part 34 is not limited to the columnar shape as long as the hole part 34 can receive the laser rod 13, and may be a prismatic shape, an elliptical columnar shape, or the like. The flash lamp 20 is capable of being taken out and inserted in the longitudinal direction, that is, to the right side in the drawing with respect to the laser chamber 30. In the present embodiment, the length of the first portion 31 of the laser chamber 30 in the longitudinal direction is longer than the length of the second portion 32 in the longitudinal direction. In addition, the lengths of the first portion 31 and the second portion 32 in the longitudinal direction may be the same as each other.

As illustrated in FIG. 2, the laser chamber 30 is supported by a supporting base 23 such that the first portion 31 that houses the flash lamp 20 protrudes to the outside from the lid part 55 of the housing 50 and the second portion 32 that houses the laser rod 13 is disposed within the housing 50, and replacement of the flash lamp 20 is allowed in a state where the lid part 55 is closed. The flash lamp 20 can be pulled out from the first portion 31 of the laser chamber to the output mirror 11 side.

The output mirror 11 is attached to a position where a height $h_1$ from the surface of the base 51 to the position of an upper end 11e of the output mirror 11 is lower than a height $h_2$ from the surface of the base 51 to the lower end of the flash lamp 20 housed in the first portion 31 of the laser chamber 30. Other optical members are not provided between the laser rod 13 and the output mirror 11. Hence, the flash lamp 20 can be easily pulled out from the hole part 34 to the output mirror 11 side in a longer direction thereof.

Figure 5:
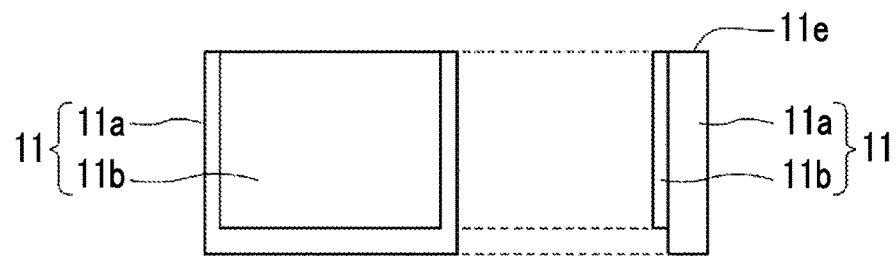
FIG. 5 is a front view and a side view of an output mirror.

A front view (left view) and a side view (right view) of the output mirror 11 are illustrated in FIG. 5. As illustrated in FIG. 5, the output mirror 11 is a planar mirror and includes a reflective coating 11b, as a resonator surface, on the surface of a flat plate-shaped base material 11a made of a multilayer film. Generally, although the planar mirror has a portion in which the reflective coating film is not formed at a peripheral edge of the surface of the base material, the output mirror 11 in the present embodiment includes the reflective coating 11b that is uniformly formed up to the upper end 11e except for a portion of a lower end and a portion of both ends. Here, as for the upper end and the lower end, with the base 51 as a reference, an end closer to the base 51 is defined as the lower end and an end separated from the base is defined as the upper end in a case where the planer mirror is installed in the solid-state laser device illustrated in FIG. 2. Such an output mirror 11 can be made, for example, by cutting one end part of a commercially available planar mirror in which the reflective coating film is not formed at the peripheral edge.

In the laser chamber 30, in order to efficiently irradiate the laser rod 13 with the excitation light from the flash lamp 20, it is preferable that the distance between the centers of the laser rod 13 and the flash lamp 20 is as close as possible. Since the output mirror 11 can be utilized as the reflecting surface up to the upper end 11e, pull-out of the flash lamp 20 to the output mirror 11 side is allowed, the flash lamp 20 can be located at a position that is as close to a resonator axis (laser optical axis) as possible within a range where a lower end position thereof does not overlap the optical path, and downsizing is also allowed. Particularly, the excitation efficiency can be made extremely high by setting the center-to-center distance between the flash lamp 20 and the laser rod 13 to 7 mm or less.

In the solid-state laser device 1, as already described, the aperture member 15, the polarizer 16, the shutter 17, the Q-switch 18, and the wedge prism pair 19 are provided as the optical members on the rear mirror 12 side of the laser rod 13.

The aperture member 15 has an opening 15a on the optical path, and blocks stray light that faces the laser rod side at a relatively large angle from the optical members 16 to 19 side and deviates greatly from the optical path. The polarizer 16 takes out only a component that is linearly polarized in a predetermined direction from oscillated laser light. The shutter 17 controls the emission of the laser light and is controlled for opening and closing to mechanically block the emission of the laser light. The Q-switch 18 performs a so-called Q-switch operation so as to generate high-output pulsed laser light.

In the solid-state laser device 1, in a case where the above Q-switch 18 is brought into a light blocking state to turn on the flash lamp 20, the laser rod 13 is excited with the excitation light emitted from the flash lamp, and a strong inverted distribution state is formed. In a case where the Q-switch 18 is brought into a light passing state after being brought into this light blocking state, the light stimulated and emitted from the laser rod 13 resonates between the mirrors 11 and 12, turns into high-output giant pulse, is transmitted through the output mirror 11, and is emitted out of the resonator. In addition, the flash lamp 20 and the laser rod 13 that generate heat are cooled by a medium that flows through the laser chamber 30.

In addition, the solid-state laser device of the invention is not limited to the device that generates the pulsed laser light in this way and may be constituted as a device that performs a continuous wave (CW) operation.

Additionally, the wedge prism pair 19 is provided in order to perform optical system adjustment, such as correction of the optical axis, by the position and the angle thereof being adjusted. By including the wedge prism pair 19, it is possible to perform extremely precise optical-axis adjustment. Here, by disposing the aperture member 15 closest to the laser rod 13 side, the aperture member 15 can suppress the progress of the stray light generated in the polarizer 16, the shutter 17, the Q-switch 18, the wedge prism pair 19, the rear mirror 12, and the like to the laser rod 13 side.

The aperture member 15 is required to have less generation of dust or outgas, have smaller absorption of the laser light, and have heat resistance. Additionally, materials having diffusivity with respect to the laser light are desirable. Hence, as the material of the aperture member 15, ceramics, ground glass, or fluororesin, such as polytetrafluoroethylene (PTFE), is suitable.

Since the aperture member 15 prevents the stray light from striking the laser chamber 30, it is desirable to dispose the aperture member 15 between the laser chamber 30 and the other optical members 16 to 19 as in the present embodiment.

The optical members 15 to 19 are attached to holders 25 to 29, respectively, and the holders 25 to 29 are installed on the base 51 that forms a portion of the housing 50. In addition, the optical members 15 to 19 may be provided as necessary. In the solid-state laser device of the invention, a configuration only including, for example, only the Q-switch among the optical members may be adopted.

As illustrated in FIG. 2, all heights of the optical members 16 to 19 excluding the aperture member 15 from the base 51 among the optical members 15 to 19 disposed on the rear mirror 12 and the rear mirror 12 side of the laser rod 13 are higher than the height $h_2$ of the lower end of the flash lamp 20. Here, the heights of the rear mirror 12 and the optical members 15 to 19 are defined as positions farthest in a direction perpendicular from the surface of the base 51 parallel to the resonator optical axis, including the holders 25 to 29 that support these. For example, a height h3 of the rear mirror 12 is a distance from the surface of the base 51 to an upper end of a rear mirror holder, and a height h4 of the Q-switch 18 is a distance from the surface of the base 51 to an upper end of a holder 28 (refer to FIG. 2). The holders of the optical members, such as the rear mirror 12 and the Q-switch 18, to be disposed on the optical path have heights required to precisely support the optical members on the optical axis. Additionally, in a case where an attempt to utilize commercially available holders is made, it is difficult to make these heights low. In a case where optical members with these high heights are disposed on the output mirror 11 side of the laser rod 13, a case where the flash lamp 20 cannot be pulled out occurs. In the solid-state laser device 1, optical members having such heights that a track in a case where the flash lamp 20 is pulled out is blocked are not disposed on the output mirror 11 side, and all optical members higher than the height $h_2$ of the lower end of the flash lamp 20 are disposed on the rear mirror 12 side of the laser rod 13. Thus, easy pull-out of the flash lamp 20 to the output mirror 11 is allowed.

Additionally, as in the solid-state laser device 1, the output mirror 11 and the rear mirror 12 constitutes a linear resonator, and all the optical members other than the output mirror 11 are configured to be disposed on the laser rod 13 and the rear mirror 12 side. Accordingly, a resonator portion of the solid-state laser device can be made extremely small, and it is possible to realize downsizing also as the entire device.

In a case where a plurality of optical members are disposed between the output mirror 11 and the rear mirror 12, especially, it is preferable that, especially, a distance from an optical member (the aperture member 15 in the present example) disposed closest to the laser rod 13 side among the optical members to the rear mirror 12 is shorter than the flash lamp 20. Accordingly, the housing part 50b can be made still smaller, and further downsizing of the housing is allowed.

As a specific configuration of this solid-state laser device 1, for example, in a case where the laser rod 13 includes an alexandrite crystal in which a diameter of 4 mm or less and a length of 75 mm or less, a resonator portion having a resonator length of 280 mm or less, a resonator width of 70 mm or less, and a height of 60 mm or less can be configured. In this case, the volume of the resonator portion is 1,176,000 mm$^3$ (=1176 cm$^3$). Here, the resonator length is a distance between the reflecting surfaces of the output mirror 11 and the rear mirror 12, and the width and the height of the resonator are defined by the largest portion of the holders of the optical members disposed within the resonator.

As an outer shape of the housing that contains the resonator, the length is 350 mm or less, the width is 160 mm or less, and height is 70 mm or less. In this case, the area of the base of the solid-state laser device can be 56,000 mm$^2$ (560 cm$^2$) or less.

In the alexandrite laser having the above configuration, in a case where the laser is driven with an input power of 22 J, a pulse laser having a pulse width of 40 nsec (n seconds) can be oscillated. In addition, it is possible to oscillate a pulse laser having a pulse width of 30 nsec less with an input power of 18 J.

Particularly, a pulse width of 40 nsec or less can be realized by using a laser rod having a diameter of 3 mm or less, and a pulse width of 30 nsec or less can be realized by setting the diameter to 2.5 mm or less.

Here, a configuration for stably allowing the output of the laser light for a long period of time in the solid-state laser device 1 of the present embodiment will be described.

Figure 6:
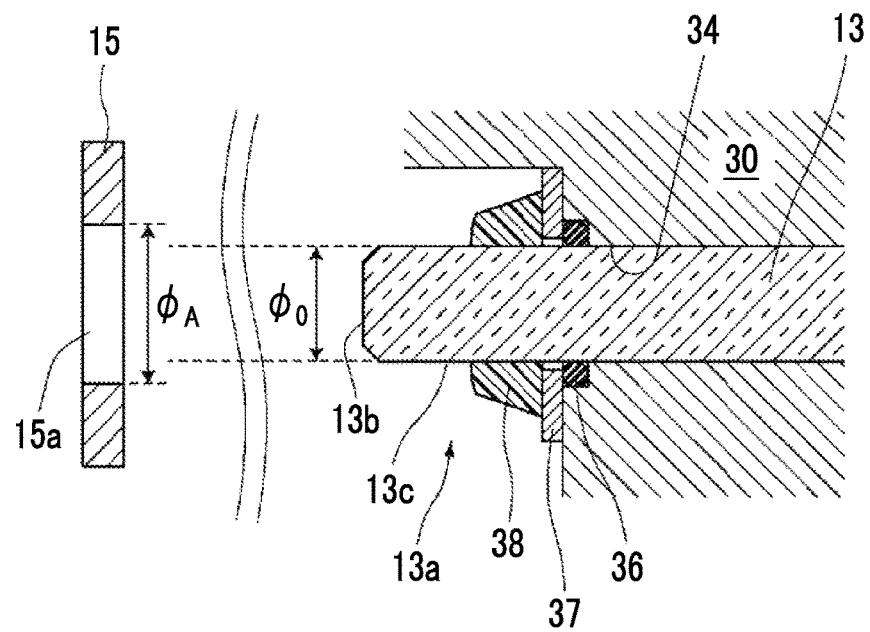
FIG. 6 is an enlarged cross-sectional view illustrating the vicinity of the laser rod end part exposed from the laser chamber.

An enlarged cross-sectional view in the vicinity of one end part (a region A surrounded by a dashed line in FIG. 2) of the laser rod 13 exposed from the laser chamber 30 is illustrated in FIG. 6. In addition, a cross-section of the aperture member 15 is altogether illustrated in FIG. 6.

As illustrated in FIG. 6, an O-ring 36 is disposed at an exposed root of an end part 13a (hereinafter, referred to as a "rod end part 13a") of the laser rod 13 from the hole part 34 of the laser chamber 30, and an O-ring retaining plate 37 having a through-hole that allows the laser rod 13 to pass therethrough is disposed adjacent to the O-ring 36 on an end face 13b (hereinafter, referred to as a "rod end face 13b") side of the laser rod 13. The inside of the laser chamber 30 serves as a flow channel for the cooling medium, and insertion parts of the laser rod 13 and the flash lamp 20 are appropriately sealed with O-rings or the like for sealing. In addition, the exposed root of the rod end part 13a from the laser chamber 30 means a portion closest to the laser chamber 30 (that is, the hole part 34 side) in the rod end part 13a exposed from the hole part 34 of the laser chamber 30. In addition, hereinafter, there is a case where the exposed root from the hole part 34 of the laser chamber 30 is referred to as an exposed root from a laser chamber. The O-ring 36 is fitted into the laser rod 13 and is disposed in an O-ring receiving part provided at an end part of the hole part 34 of the laser chamber 30. By screwing the O-ring retaining plate 37 to the laser chamber 30, the O-ring 36 is biased to the laser chamber 30 side, and the laser rod 13 is fixed. A cover member 38, which hinders the incidence of the stray light generated within the housing 50 to the O-ring 36, is provided on a side surface 13c (hereinafter, referred to as a "rod side surface 13c") of the laser rod closer to the rod end face 13b than the O-ring 36 fitted into the rod end part 13a.

Although it is preferable that the O-ring 36, the O-ring retaining plate 37, and the cover member 38 are provided at each of both end parts exposed from the laser chamber 30, the O-ring 36, the O-ring retaining plate 37, and the cover member 38 may be provided at least at one end part. Additionally, the O-ring retaining plate 37 may not be provided in a case where the cover member 38 has the same function as that of the O-ring retaining plate 37.

In the solid-state laser device, the laser rod that is a solid-state laser medium is the optical path itself, and it can be said that a member touching the laser rod is substantially in contact with the optical path. As illustrated in FIG. 6, the O-ring 36 is present very near the rod end face 13b, and dust or gas is likely to adhere to the rod end face 13b in a case where the dust or the gas is generated in the O-ring 36. Then, in a case where the dust or the gas adhering to the rod end face 13b is irradiated with the laser light, there is a case where seizure is caused and the laser rod 13 is damaged. In the solid-state laser device 1 of the present embodiment, the incidence of the stray light to the O-ring 36 can be prevented by including the above cover member 38. Thus, generation of dust or outgas can be effectively suppressed.

The cover member 38 is required to have less generation of dust or outgas, have smaller absorption of the laser light, and have heat resistance. Additionally, it is desirable to have diffusivity with respect to the laser light. Hence, it is preferable that the cover member 38 is made of at least one of ceramics, ground glass, or fluororesin, such as PTFE. In order to prevent the stray light from entering the O-ring 36, it is desirable that the cover member 38 is made of a flexible material having high adhesion to the laser rod 13. Hence, particularly, fibrous ceramics or glass, non-baked fluororesin, or the like is suitable.

As illustrated in FIG. 6, in the solid-state laser device 1, the opening diameter of the aperture member 15 is preferably the rod diameter $\varphi_0$ or more, and more preferably larger than the rod diameter $\varphi_0$. Particularly, in a case where a fine-diameter laser rod having a rod diameter $\varphi_0$ of 4 mm or less is adopted as the laser rod 13 for downsizing the device and making the pulses of the laser light short, the opening limitation by the aperture member 15 greatly affects the laser output. That is, with respect to the fine-diameter laser rod, the arrangement precision of the aperture member 15 has high sensitivity for the laser output. Thus, in a case where the arrangement precision of the aperture member 15 is low, a decrease in stability occurs, while enhancing the arrangement precision leads to an increase in manufacturing cost. Hence, in a case where the fine-diameter laser rod is adopted, it is more desirable that the opening diameter of the aperture member is larger than the rod diameter. However, in a case where the opening diameter of the aperture member is too large, there is a case where the blocking effect of the stray light is not sufficiently obtained. Therefore, it is preferable to set the opening diameter to 120% or less of the rod diameter. In addition, it is preferable that the opening shape of the aperture member 15 is similar to the end face shape of the laser rod 13.

In the present embodiment, although the aperture member 15 is disposed only on the rear mirror 12 side of the laser rod 13, it is preferable that the aperture member 15 is disposed on each of both end face sides of the laser rod 13 from a viewpoint of protection by the blocking of the stray light. However, in a case where the aperture member 15 is disposed on each of both end face sides of the laser rod 13, request for the arrangement precision increases, which leads on an increase in manufacturing increase. Particularly, this request is remarkable in a case where the rod has a fine diameter. In the present embodiment, since the various optical members 16 to 19 are intensively disposed on the rear mirror 12 side of the laser rod 13 to bring the generation point of main stray light to one side, a highly sufficient protection effect is obtained even in a case where the aperture member 15 is disposed only on one side.

Figure 7:
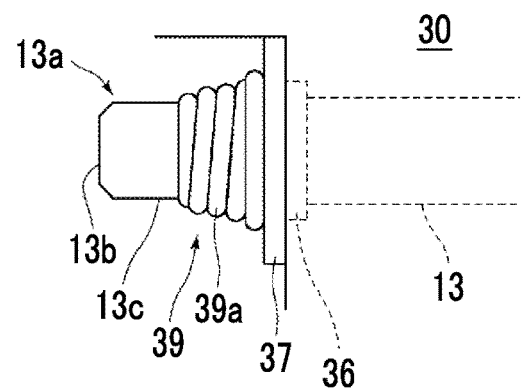
FIG. 7 is an enlarged view illustrating the vicinity of a laser rod end part including a cover member of a design change example.

FIG. 7 is an enlarged view illustrating the vicinity of a laser rod end part including a cover member 39 of a design change example. The cover member 39 illustrated in FIG. 7 is formed by winding a tape 39a made of PTFE around the rod side surface 13c multiple times. The cover member 39 configured by winding the tape 39a multiple times has high adhesion with the laser rod 13 and the size thereof can be freely changed depending the number of times of winding, which is preferable. By winding the tape 39a to such a degree that the O-ring 36 cannot be visually recognized in a case where a visual recognition is made from the rod end face 13b side, the incidence of the stray light to the O-ring 36 can be effectively suppressed.

Additionally, in FIG. 7, in a case where the O-ring 36 is sufficiently biased by the cover member 39 to allows the laser rod 13 to be fixed, the O-ring retaining plate may not be provided.

In addition, a general O-ring made of rubber that is not based on fluororesin can be used as the O-ring 36. Meanwhile, it is more preferable to make the O-ring 36 itself of a material with less generation of dust or outgas, for example, fluororesin-based rubber.

Additionally, as illustrated in FIG. 6, in a case where the O-ring retaining plate 37 is provided, there is a case that the stray light is incident on the O-ring retaining plate 37 and dust or outgas is generated. Therefore, as the O-ring retaining plate 37, it is also preferable to use an O-ring retaining plate using a material with less generation of dust or outgas, for example, ceramics, fluororesin, or the like. Alternatively, it is also preferable to adopt a configuration in which the cover member is enlarged to suppress the incidence of the stray light to the O-ring retaining plate.

As described above, in a case where the cover members 38 and 39 that suppress the stray light to the O-ring 36 at the exposed root of the laser rod 13 from the laser chamber 30 are provided, damage to the laser rod 13 can be suppressed, and stable laser output for a long period of time can be obtained. Additionally, in a case where the aperture member 15 is provided, the incidence of the stray light to the laser chamber 30 can also be suppressed, and it is possible to more effectively suppress damage to the laser rod 13.

It is particularly preferable that the aperture member 15 and the cover member 38 or 39 are simultaneously provided on the same end face side of the laser rod 13. However, the solid-state laser device of the invention is not limited to a configuration in which the aperture member and the cover member are provided on the same end face side, and it is preferable that at least the cover member is provided on either a rear side or an output side. In the present embodiment, since the various optical members 16 to 19 are intensively disposed on the rear mirror 12 side of the laser rod 13 to bring the generation point of main stray light to one side, combination patterns of the arrangement of the aperture member and the cover member include patterns as shown in the following Table 1 as minimum configurations. In Table 1, the rear side and the output side respectively mean the rear mirror 12 side and the output mirror 11 side of the laser rod 13. In Table 1, "Yes" means that the aperture member or the cover member is provided and "-" means that the aperture member or the cover member is not provided. With respect to the minimum configurations illustrated in Table 1, combinations obtained by changing "-" into "Yes" are also preferable.

TABLE 1

| No. | Rear Side | | Output Side | |
|-----|-----------|--------------|-------------|--------------|
|     | Aperture  | Cover Member | Aperture    | Cover Member |
| 1   | Yes       | Yes          | —           | —            |
| 2   | Yes       | —            | —           | Yes          |

A configuration in which the aperture member and the cover member are provided on both end faces of the laser rod is the most preferable from a viewpoint of suppressing the incidence of the stray light to the laser rod and the laser chamber. Meanwhile, as already described, in the case where the aperture member is provided on each of both the end faces, substantial time and effort are taken for alignment, which leads to an increase in manufacturing cost. The configuration described as the above-described embodiment is equivalent to Pattern No. 1 in Table 1. It is preferable that the aperture member and the cover member are simultaneously provided on a side where the optical members, such as the Q-switch and the shutter are disposed (the rear side in the present embodiment) as in the present embodiment because the incidence of the stray light can be most efficiently suppressed and manufacturing costs can also be suppressed.

Figure 8:
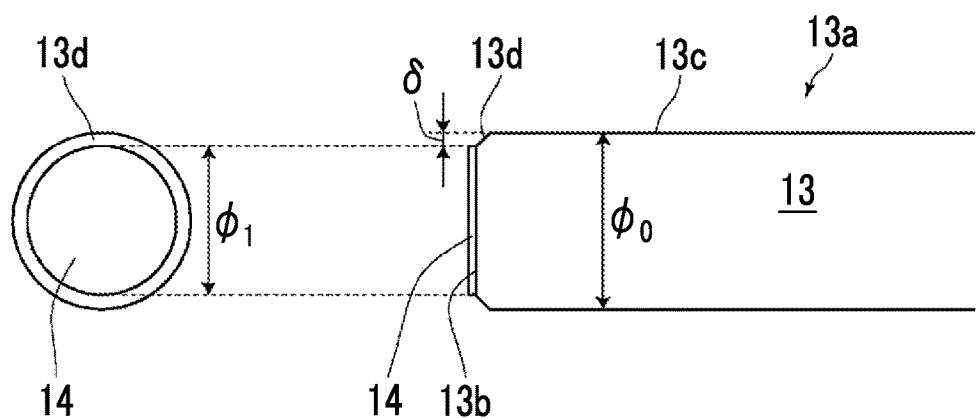
FIG. 8 is an end front view and an end part side view of the laser rod.

Now, the configuration of an end face of the laser rod 13 will be described in more detail. FIG. 8 illustrates a side view (right view) and an end front view (left view) of the end part 13a of the laser rod 13. As illustrated in FIG. 8, the laser rod 13 includes a chamfered part 13d between the rod end face 13b and the rod side surface 13c. That is, the laser rod 13 has the chamfered part 13d at a peripheral edge of the end face 13b, specifically, on a radial outer side of an outer periphery of the end face 13b. The chamfered part 13d is a rough surface. The rod end face 13b is provided with an antireflection film 14. In FIG. 8, although only one end face of the laser rod is illustrated, both end faces have the same configuration. It is preferable that the antireflection film 14 is provided on the entire face of the rod end face 13b.

A width δ of the chamfered part 13d equivalent to a difference between the radius of the laser rod 13 and the radius of outer periphery of the end face is about 1 to 5%, preferably about 2% of the rod diameter $\varphi_0$. For example, in a case where the rod diameter $\varphi_0$ is 2.5 mm, the width δ of the chamfered part 13d is set to 0.05 mm or the like.

Here, a separate additional configuration for stably allowing the output of the laser light for a long period of time in the solid-state laser device 1 of the present embodiment will be described. An enlarged cross-sectional view in the vicinity of one end part (the region A surrounded by a dashed line in FIG. 2) of the laser rod 13 exposed from the laser chamber 30 in a case where the separate additional configuration is provided is illustrated in FIG. 9.

A configuration in which the O-ring 36, and the O-ring retaining plate 37 having a through-hole for allowing the laser rod 13 to pass therethrough, on the rod end face 13b side adjacent to the O-ring 36 are disposed at the root of exposure from the laser chamber 30 of the laser rod 13 is the same as that of FIG. 6.

Figure 9:
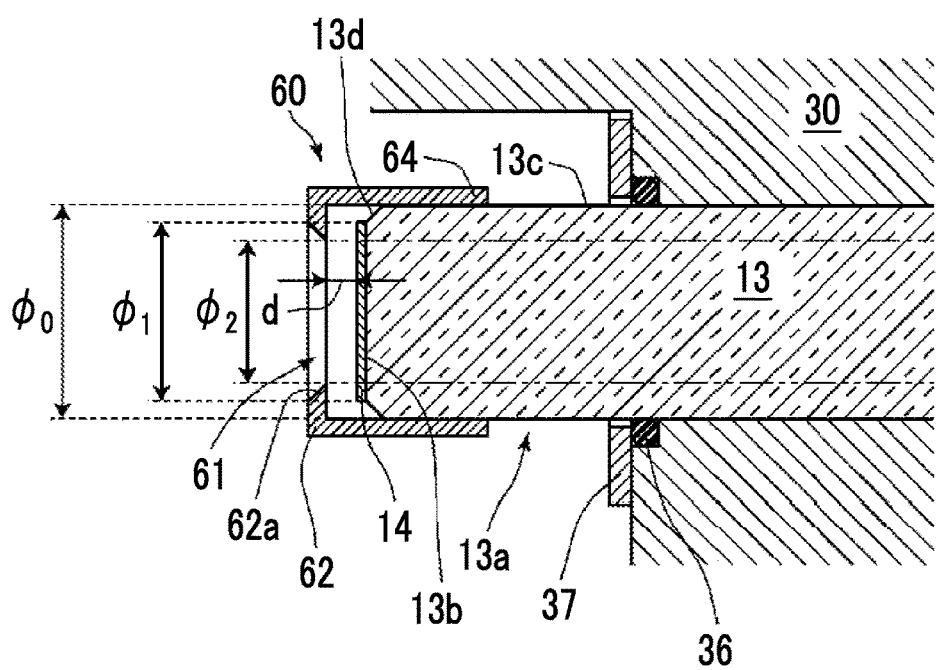
FIG. 9 is an enlarged cross-sectional view illustrating the vicinity of the laser rod end part exposed from the laser chamber.

In the example illustrated in FIG. 9, an end face protecting member 60 having an opening defining part 62 that constitutes an opening 61 having a diameter $\varphi_2$ smaller than a diameter $\varphi_1$ of the outer periphery of the rod end face 13b is provided at a position facing the rod end face 13b. The end face protecting member 60 limits a laser light path region in the rod end face 13b to a region inside the outer periphery of the rod end face 13b. In a case where the end face protecting member 60 is not provided, the entire region of the laser rod 13 is the optical path, and an optical-path cross-section is equal to a circular cross-section having the diameter $\varphi_0$. However, the optical path is limited to a circular cross-section region having the diameter $\varphi_2$ illustrated by a two-point chain line in FIG. 9 by including the end face protecting member 60.

In this way, by including the end face protecting member 60, the laser light path region is limited to the region inside the outer periphery of the rod end face 13b, that is, the laser light path is limited to a region inside an inner periphery of the chamfered part 13d. Hence, during laser oscillation, the laser light is not radiated to a boundary between the rod end face 13b and the chamfered part 13d. As already described, it cannot be said that the boundary between the rod end face 13b and the chamfered part 13d have excellent coating of an optical film, and is a region that is likely to be a starting point of coating breaking. However, occurrence of the coating breaking can be suppressed as long as high-energy laser light is not radiated. That is, the occurrence of the coating breaking in the rod end face 13b can be suppressed by including the end face protecting member 60.

Figure 10:
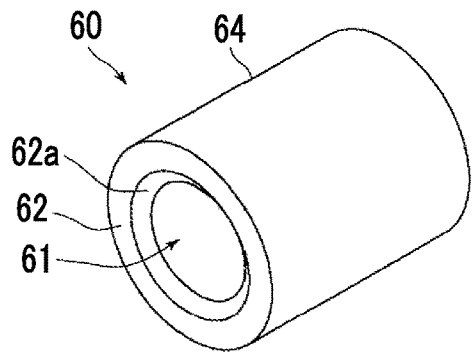
FIG. 10 is a perspective view of an end face protecting member.

As illustrated in a perspective view of the end face protecting member 60 in FIG. 10, the end face protecting member 60 in the present embodiment has a tubular part 64 that supports the opening defining part 62, and has a cap shape in which the tubular part 64 is fitted and mounted to the rod end part 13a. The shape of the end face protecting member 60 is not particularly limited as long as the opening defining part 62 can be stably supported and disposed in the vicinity of the rod end face 13b. However, it is preferable as long as the end face protecting member 60 has the cap shape capable of being fitted and mounted as in the present embodiment because the arrangement precision can be easily guaranteed.

It is essential that the opening defining part 62 is provided very close to the rod end face 13b so as to cover the boundary between the rod end face 13b and the chamfered part 13d. The term "very close" means such a distance that a distance d (refer to FIG. 9) between the rod end face 13b and the opening defining part 62 has no significant difference in the effect on a state (that is, d=0) where both come into contact with each other. Specifically, the distance d is preferably 0.5 mm or less and more preferably 0.1 mm or less, and it is particularly preferable that the rod end face 13b and the opening defining part 62 come into contact with each other. In addition, since the antireflection film 14 is provided on the surface of the rod end face 13b, in the present specification, the distance of the opening defining part 62 from the rod end face 13b means a distance between the opening defining part 62, and the surface of the antireflection film 14 provided on the rod end face 13b. Similarly, the contact between the rod end face 13b and the opening defining part 62 means that the surface of the antireflection film 14 provided on the rod end face 13b, and the opening defining part 62 come into contact with each other.

Additionally, as illustrated in FIG. 9, it is preferable the opening defining part 62 of the end face protecting member 60 include a tapered part 62a of which the opening diameter becomes smaller as being closer to the rod end face 13b. By including the tapered part 62a, vignetting of the optical path by the opening defining part 62 can be suppressed.

Figure 11:
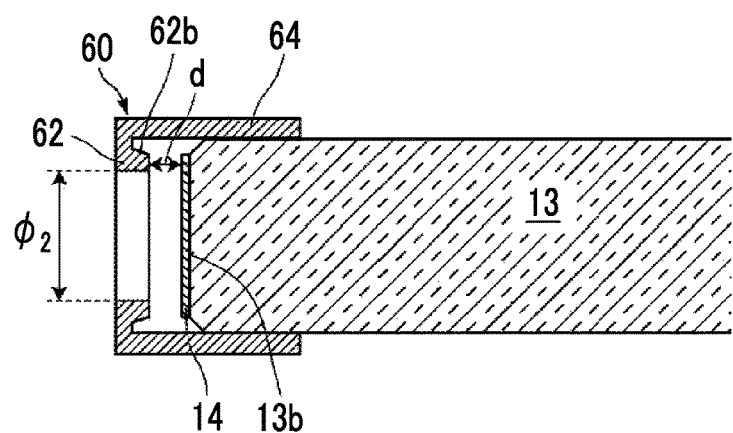
FIG. 11 is a view for explaining a distance d between an opening defining part and the rod end face.

In addition, the distance between the opening defining part 62 and the rod end face 13b is defined as a distance between a portion located closest to the rod end face 13b side in the portion constituting the diameter $\varphi_2$ of the opening defining part 62, and the rod end face 13b. For example, in the case of a shape which a portion 62b constituting the diameter $\varphi_2$ of the opening defining part 62 protrudes to the rod end face 13b side as shown in FIG. 11, a distance from the face of the protruding portion 62b on the rod end face 13b side to the rod end face 13b is the distance d between the opening defining part 62 and the rod end face 13b.

Although the end face protecting member 60 is provided on each of both the end faces of the laser rod 13, the end face protecting member 60 may be provided on any one end face. Even only one end face protecting member exhibits the effect of limiting a laser oscillation region. In a case where the fine-diameter laser rod is adopted in accordance with requests for downsizing the device, making the pulses short, and the like, the opening limitation greatly influences the laser output. That is, in a case where each of both end parts of the fine-diameter laser rod is provided with the end face protecting member, the manufacture precision and the arrangement precision of the end face protecting member have high sensitivity for the laser output. As a result, there is a case where this leads to a decrease in stability or an increase in manufacturing cost. Hence, it is desirable that the protecting member is provided only on one end face.

Since the opening defining part 62 of the end face protecting member 60 is in contact with the laser light path, as materials, it is required that there is no damage or deformation resulting from the laser light and there is less generation of dust or outgas. Hence, as materials of the opening defining part 62, ceramics or fluororesin is suitable. It is preferable that the entire end face protecting member 60 including the opening defining part 62 is made of at least one of ceramics or fluororesin.

Figure 12:
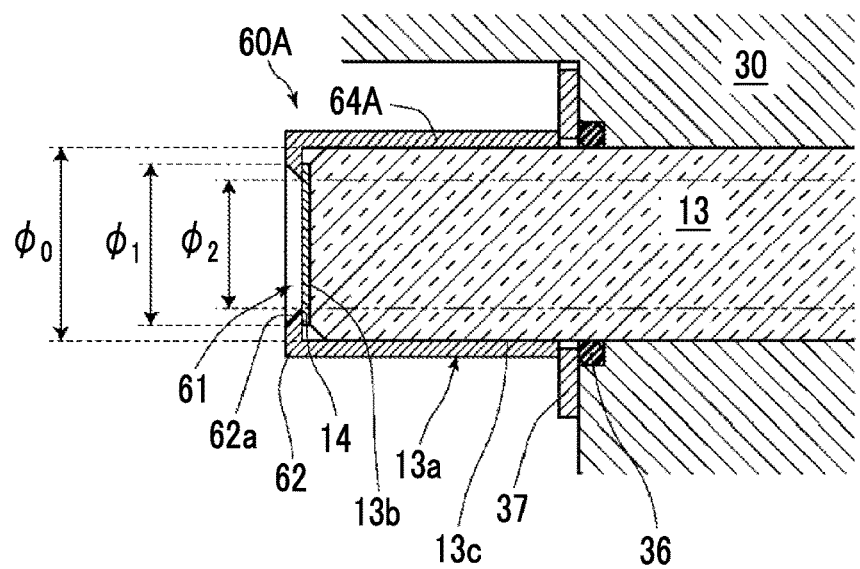
FIG. 12 is an enlarged cross-sectional view illustrating the vicinity of a laser rod end part including an end face protecting member of a design change example.

FIG. 12 is a cross-sectional view illustrating a design change example of the end face protecting member.

An end face protecting member 60A illustrated in FIG. 12 has such a length the opening defining part 62 comes into contact with the rod end face 13b (here, the antireflection film 14 formed on the rod end face 13b) and a tubular part 64A collides against the O-ring retaining plate 37 provided at the exposed root of the laser rod 13 from the laser chamber 30. In this way, by forming the end face protecting member 60A in the shape of a cover that covers the entire exposed portion of the rod side surface 13c of the end part 13a of the laser rod 13 exposed from the laser chamber 30, the arrangement precision of the opening defining part 62 with respect to the rod end face 13b can be enhanced, which is preferable. Additionally, by including the end face protecting member 60A having a shape that covers up to the exposed root of the laser rod 13, it is possible to suppress the incidence of the stray light generated within the housing 50 onto the O-ring 36 provided at the exposed root of the laser rod 13 from the laser chamber 30. In a case where the stray light is incident, there is a case where dust or outgas is generated from the O-ring 36, and the dust or outgas adheres to the rod end face, causes seizure, and damages the rod end face. However, since the incidence of the stray light onto the O-ring 36 can be suppressed by the end face protecting member 60A, the damage to the laser rod can be more effectively prevented.

Figure 13:
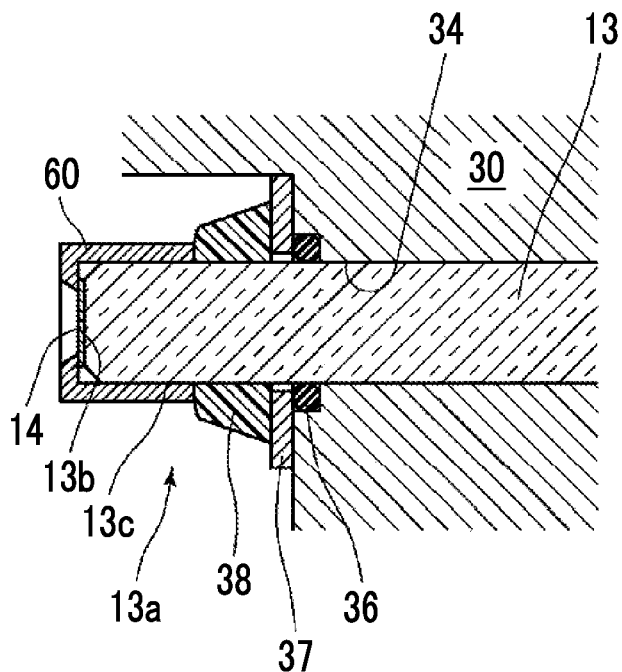
FIG. 13 is an enlarged cross-sectional view illustrating the vicinity of a laser rod end part of a solid-state laser device related to a second embodiment.

The above cover member 38 and the above end face protecting member 60 can also be used in combination. FIG. 13 illustrates an enlarged cross-sectional view of an exposed part of the laser rod 13 from the laser chamber 30 in a case where the cover member 38 and the end face protecting member 60 are provided in combination.

By including the above cover member 38 and the above end face protecting member 60, the entire region of the side surface 13*c* of the rod end part 13*a* is covered similarly to a case where the end face protecting member 60A illustrated in FIG. 12 is provided. Therefore, the incidence of the stray light onto the O-ring 36 can be prevented by the cover member 38 in addition to the prevention of the damage to the antireflection film 14 by the end face protecting member 60. Thus, the generation of dust or gas can be effectively suppressed, the damage to the laser rod 13 can be effectively suppressed, and it is possible to realize further stability for a long period of time.

Figure 14:
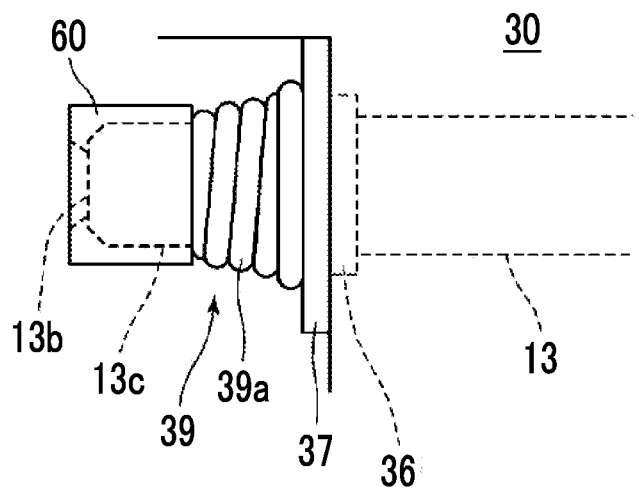
FIG. 14 is a side view illustrating the vicinity of a laser rod end part including a cover member of a design change example.

Additionally, as illustrated in FIG. 14, even in a case where the cover member 39 illustrated in FIG. 7 and the end face protecting member 60 are provided in combination, the same effects can be obtained.

In addition, it is particularly preferable that the aperture member 15, the cover member 38 or 39, and the end face protecting member 60 or 60A are simultaneously provided on the same end face side of the laser rod 13. However, all the members are not necessarily provided simultaneously, and the solid-state laser device of the invention has a configuration in which any of these members is additionally provided. In addition, as preferable arrangement patterns of minimum configurations, arrangement patterns illustrated in the following Table 2 are mentioned. In Table 2, the rear side and the output side respectively mean the rear mirror 12 side and the output mirror 11 side of the laser rod 13. In Table 2, "Yes" means that the aperture member, the cover member, or the end face protecting member is provided and "-" means that the aperture member, the cover member, or the end face protecting member is not provided. With respect to the minimum configurations illustrated in Table 2, combinations obtained by changing "-" into "Yes" are also preferable.

TABLE 2

| | Rear Side | | | Output Side | | |
|---|---|---|---|---|---|---|
| No. | Aperture | Cover Member | End Face Protecting Member | Aperture | Cover Member | End Face Protecting Member |
| 1 | Yes | Yes | — | — | — | Yes |
| 2 | Yes | — | Yes | — | Yes | — |
| 3 | Yes | — | Yes | — | — | Yes |
| 4 | Yes | — | Yes | — | — | — |
| 5 | Yes | — | — | — | — | Yes |

As in the above configuration, it is preferable that the aperture member is provided on the rear side where many optical members are disposed. Additionally, here, as the end face protecting member, the fitting type having the cap shape in which the optical axis alignment is unnecessary is assumed. Therefore, the end face protecting member is preferably provided on at least one end face, and more preferably provided on each of both ends.

Figure 15:
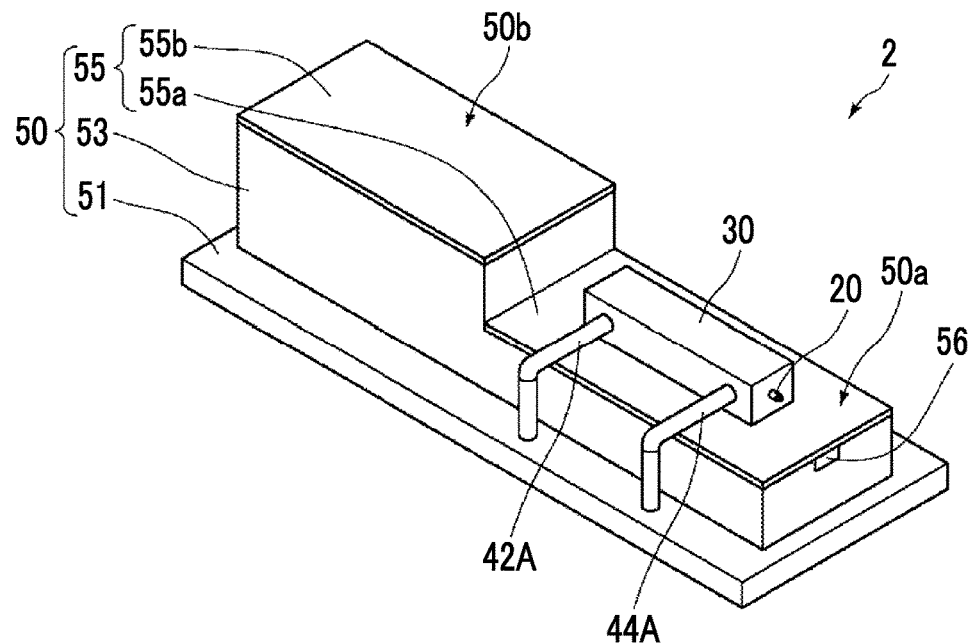
FIG. 15 is a schematic perspective view of the solid-state laser device related to the second embodiment.
Figure 16:
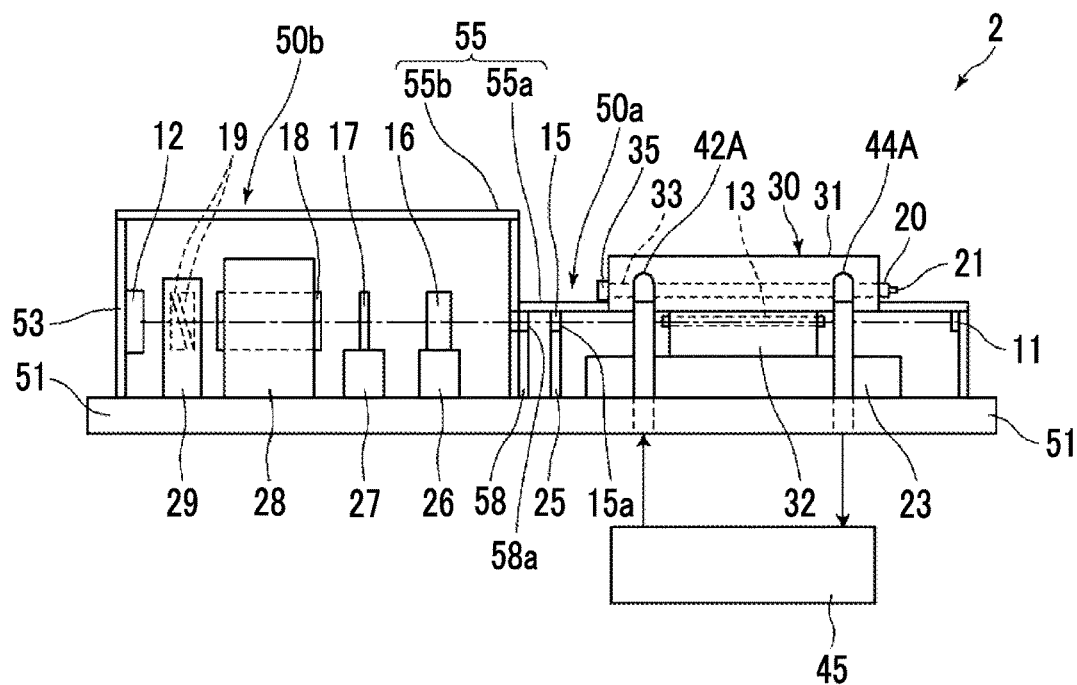
FIG. 16 is a side schematic view illustrating a schematic configuration in a side view of the solid-state laser device related to the second embodiment.
Figure 17:
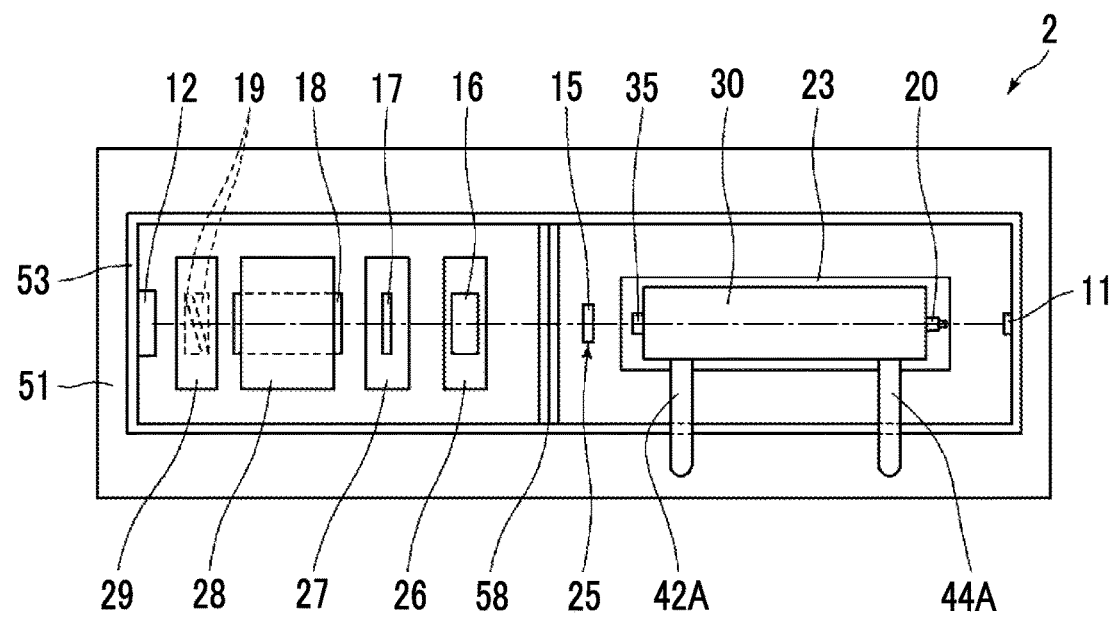
FIG. 17 is a plan schematic view illustrating the schematic configuration in a plan view of the solid-state laser device related to the second embodiment.

Next, a solid-state laser device 2 of a second embodiment will be described. FIG. 15 is a perspective view schematically illustrating an external shape of the solid-state laser device related to the second embodiment of the invention. Additionally, FIGS. 16 and 17 are a schematic side view and a schematic plan view of the solid-state laser device related to the present embodiment, and both schematically illustrate the arrangement of internal constituent elements with a portion of the housing omitted.

Here, only differences from those of the solid-state laser device 1 of the first embodiment will be described. The same constituent elements as those of the solid-state laser device 1 of the first embodiment will be designated by the same reference signs, and the detailed description thereof will be omitted.

In the solid-state laser device 2 of the present embodiment, one end (here, one end on the rear mirror 12 side) of the hole part 33 that houses the flash lamp 20 of the laser chamber 30 is provided with a sealing terminal 35 having a socket or a plug having electrodes. That is, one end of the hole part 33 has a butting structure in which terminals of the electrodes are buried therein. The flash lamp 20 is inserted into the hole part 33 from the right side in FIG. 16, butts against the sealing terminal 35, and is connected to a power source terminal. As in the present configuration, by making the hole part 33 for housing the flash lamp 20 have the butting structure, positioning of the flash lamp 20 during replacement becomes easy, and a decrease in the excitation efficiency resulting from the positional deviation of the flash lamp 20 during replacement, or the like, can be prevented.

Additionally, in the solid-state laser device 1 of the first embodiment, the pipes 42 and 44 for a cooling medium connected to the laser chamber 30 are configured to extend in a horizontal direction. In contrast, in the solid-state laser device 2 of the present embodiment, the pipes 42A and 44A are bent in an L-shape and are disposed to extend in a direction perpendicular to a base toward the base 51 along a wall surface of the side wall part 53 of the housing 50. The hole is provided outside the side wall part 53 of the base 51, and the pipes 42A and 44A are connected to a cooler 45 disposed under the base 51 from this hole. In addition, as for the pipes 42A and 44A, it is preferable that portions connected to the laser chamber 30 are connected by members having rigidity, such as metal, and portions from the rigid members to the cooler 45 are made of flexible members, such as hoses.

In the solid-state laser device 1 of the first embodiment, in a case where the hoses are connected to the pipes 42 and 44, it is necessary to take into consideration a space for bending the hoses so as to be connected to the cooler. Meanwhile, in a case where a configuration in which the housing 50 is supported by fixing the base 51 to a frame having the space under the base 51 using the solid-state laser device 2 of the present embodiment is adopted, and the cooler is installed under the base 51, it is unnecessary to take into consideration a space, which is equal to or larger than the width of the base, as an installation space.

The solid-state laser device of the invention is not limited in application and can be used for various applications. For example, the solid-state laser device can be preferably used as a measurement light source that generates laser light (especially, pulse laser light) to be radiated to a subject for photoacoustic wave detection in photoacoustic measurement devices described in JP2012-196430A, JP2014-207971A, and the like.

EXPLANATION OF REFERENCES

1, 2: solid-state laser device
11: output mirror
11*a*: base material
11*b*: reflective coating film
11*e*: upper end
12: rear mirror
13: laser rod
13*a*: rod end part
13*b*: rod end face
13*c*: rod side surface
13*d*: chamfered part 14: antireflection film
15: aperture member
15a: opening of aperture member
16: polarizer
17: shutter
18: Q-switch
19: wedge prism pair
20: flash lamp (excitation light source)
21: terminal
23: supporting base
25 to 29: holder
30: laser chamber
31: first portion (holding part)
32: second portion
33, 34: hole part
35: sealing terminal
36: O-ring
37: O-ring retaining plate
38, 39: cover member
39a: tape
42, 42A, 44, 44A: pipe
45: cooler
50: housing
50a: first housing part
50b: second housing part
51: base
53: side wall part
55: lid part
55a: first lid
55b: second lid
56: emission opening
58: partition plate
58a: opening
60, 60A: end face protecting member
61: opening
62: opening defining part
62a: tapered part
62b: tubular part of opening defining part
64, 64A: tubular part

What is claimed is:

1. A solid-state laser device comprising:
a linear resonator in which an output mirror and a rear mirror are disposed on a straight line;
a laser rod disposed on an optical path of the resonator;
optical members at least including a Q-switch; and
a rod-shaped excitation light source that extends parallel to the laser rod and emits excitation light that excites the laser rod,
wherein the resonator, the laser rod, and the optical members are provided on a common base and are contained in a housing having the base as a portion,
wherein a holding part is provided to hold the excitation light source parallel to the laser rod on a side of the laser rod opposite to the base,
wherein the optical members including the Q-switch are disposed between the laser rod and the rear mirror,
wherein an upper end position of the output mirror is at a position lower than a lower end position of the excitation light source held by the holding part, with the base as a reference, and
wherein the holding part holds the excitation light source so as to be capable of being inserted and extracted with respect to the output mirror side in a longitudinal direction of the excitation light source.

2. The solid-state laser device according to claim 1, wherein the output mirror is formed such that a reflective coating of a resonator surface of the output mirror is provided up to the upper end position.

3. The solid-state laser device according to claim 1, wherein upper end positions of the Q-switch and the rear mirror are higher than the lower end position of the excitation light source held by the holding part with the base as a reference.

4. The solid-state laser device according to claim 1, further comprising:
a shutter as the optical member,
wherein the shutter is provided between the laser rod and the Q-switch, and
wherein a partition plate having an opening in the optical path is provided between the laser rod and the shutter inside the housing.

5. The solid-state laser device according to claim 1, wherein the housing has a first housing part that houses the output mirror and the laser rod, and a second housing part that houses the rear mirror and the optical members, and
wherein the first housing part includes a first lid that opens the first housing part, the second housing part includes a second lid that opens the second housing part, and the first housing part and the second housing part are openable independently.

6. The solid-state laser device according to claim 5, wherein a material forming the first lid and a material forming portions of the first housing part other than the first lid have linear thermal expansion coefficients of the same order.

7. The solid-state laser device according to claim 1, wherein the holding part includes a hole part that houses the excitation light source, and has a butting structure for the excitation light source in which a power source terminal is provided at an end of the hole part on the rear mirror side.

8. The solid-state laser device according to claim 1, further comprising:
a pipe that supplies a cooling medium for cooling the excitation light source to the holding part,
wherein the pipe is disposed to extend in a direction perpendicular to the base along a side surface of the housing from a hole provided in the base and is connected to the holding part.

9. The solid-state laser device according to claim 1, further comprising:
a laser chamber having a columnar hole part shorter than a major-axis length of the laser rod,
wherein the laser rod is inserted through the hole part, of the laser chamber and is supported by the laser chamber in a state where both end parts of the laser rod are exposed from the hole part,
wherein an O-ring is provided at a root of at least one of both the end parts of the laser rod exposed from the hole part, and
wherein a cover member that hinders incidence of stray light generated within the housing onto the O-ring is further provided on a side surface of the laser rod closer to an end face side than the O-ring.

10. The solid-state laser device according to claim 9, further comprising:
an O-ring retaining plate between the cover member and the O-ring,
wherein the O-ring retaining plate is made of at least one of ceramics, glass, or fluororesin.

11. The solid-state laser device according to claim 1, further comprising:
a laser chamber having a columnar hole part shorter than a major-axis length of the laser rod,
wherein the laser rod is inserted through the hole part of the laser chamber, and is supported by the laser chamber in a state where both end parts of the laser rod are exposed from the hole part,
wherein an O-ring is provided at a root of at least one of both the end parts of the laser rod exposed from the hole part, and
wherein the O-ring is made of fluororesin.

12. The solid-state laser device according to claim 1,
wherein the laser rod has an antireflection film on an end face thereof and has a chamfered part at a peripheral edge of the end face, and
wherein an opening defining part that constitutes an opening having a diameter smaller than a diameter of an outer periphery of the end face is provided at a position that faces at least one end face of the laser rod, and an end face protecting member is provided to limit a laser light path region in the end face of the laser rod to a region inside the outer periphery of the end face.

13. The solid-state laser device according to claim 1,
wherein a distance from an optical member disposed closest to the laser rod side among the optical members to the rear mirror is shorter than a length of the excitation light source.

14. The solid-state laser device according to claim 1,
wherein the laser rod is made of an alexandrite crystal.

15. The solid-state laser device according to claim 1,
wherein a diameter of the laser rod is 3 mm or less, and a diameter of the excitation light source is 1.5 times or more the diameter of the laser rod.

16. The solid-state laser device according to claim 15,
wherein a length of the laser rod is 75 mm or less.

* * * * *